United States Patent [19]

Sawyer

[11] Patent Number: 4,608,826
[45] Date of Patent: Sep. 2, 1986

[54] MASTER CYLINDER CONSTRUCTIONS

[75] Inventor: Patrick F. Sawyer, Heathcote, Australia

[73] Assignee: Girlock Limited, Belmore, Australia

[21] Appl. No.: 734,765

[22] Filed: May 15, 1985

Related U.S. Application Data

[63] Continuation of Ser. No. 495,537, May 17, 1983, abandoned.

[30] Foreign Application Priority Data

May 18, 1982 [AU] Australia ............................. 4054/82

[51] Int. Cl.⁴ .............................................. B60T 13/00
[52] U.S. Cl. ...................... 60/547.1; 92/108; 92/169; 60/578
[58] Field of Search .............. 60/574, 578, 581, 547.1; 92/107, 108, 169.2, 169.3, 169.4

[56] References Cited

U.S. PATENT DOCUMENTS

| | | | |
|---|---|---|---|
| 2,311,787 | 2/1943 | Swift | 60/578 |
| 2,335,069 | 11/1943 | Loweke | 60/578 |
| 3,172,265 | 3/1965 | Randol | 92/107 X |
| 4,086,770 | 5/1978 | Shaw | 60/574 X |
| 4,270,353 | 6/1981 | Thomas et al. | 60/581 X |
| 4,329,846 | 5/1982 | Gaiser | 60/578 X |
| 4,408,457 | 10/1983 | Luepertz | 92/169.3 |
| 4,481,865 | 11/1984 | Becht | 92/169.4 |

FOREIGN PATENT DOCUMENTS 6829281 3/1981 Australia .
6895881 3/1981 Australia .

Primary Examiner—Abraham Hershkovitz
Attorney, Agent, or Firm—Davis Hoxie Faithful & Hapgood

[57] ABSTRACT

A master cylinder construction for automotive brake systems incorporating a servo mechanism in which the master cylinder consists of primary, secondary and fast fill pistons arranged in tandem, the fast fill piston operating in a bore of a larger diameter than that of the primary and secondary pistons the arrangement being characterized in that the fast fill piston is of hollow annular construction consisting of an inner cylindrical wall and an outer cylindrical wall joined together at one end and defining between them an annular space open at the other end, the outer wall being arranged to stroke past a seal into an annular cavity at one end of the master cylinder surrounding part of the bore of the primary piston of the master cylinder and to displace fluid therefrom. The primary piston is constructed to move simultaneously within its bore and to displace fluid therefrom to initiate movement of the secondary piston. Such an arrangement enables the master cylinder to be mounted within the shell of a servo mechanism in close proximity to the piston thereof thereby diminishing the extent to which the master cylinder projects from the shell of the servo mechanism making it particularly suitable for use in motor vehicles having a front wheel drive and a transversely mounted engine.

3 Claims, 3 Drawing Figures

MASTER CYLINDER CONSTRUCTIONS

This is a continuation of co-pending application Ser. No. 495,537 filed on May 17, 1983, now abandoned.

The present invention relates to a master cylinder construction for automotive brake systems incorporating a servo mechanism and in particular to master cylinders of the kind incorporating primary, secondary and fast-fill pistons operating in bores of different diameters, the fast-fill piston operating in a bore of larger diameter than the primary and secondary pistons. The purpose and effectiveness of this arrangement is well known in the design of fast-fill master cylinders and it is therefore unnecessary to describe it in any detail.

In such constructions the primary, secondary, and fast-fill pistons are arranged in tandem with the result that the master cylinder body has to be longer than that of a conventional master cylinder by at least the stroke of the fast-fill piston.

Figure 1:
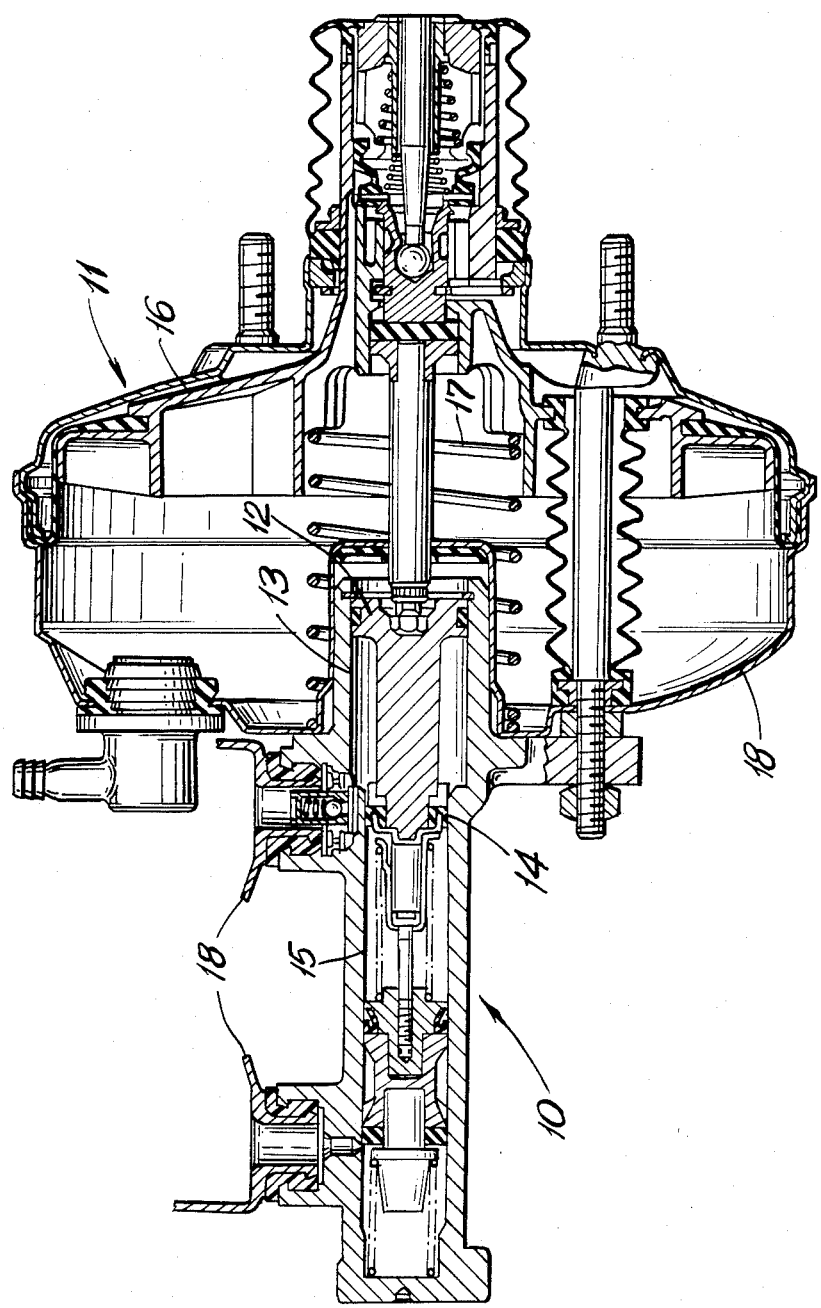
FIG. 1 is a cross-sectional view of a known master cylinder construction of the kind with which the present invention is concerned.

In FIG. 1 a master cylinder indicated generally at 10 is shown attached to a servo mechanism indicated generally at 11. A fast-fill piston 12 strokes in a bore 13 whereas the primary piston 14 strokes in a bore 15. The servo mechanism 11 includes a piston 16 which moves from right to left as seen in FIG. 1 against a spring 17. To permit movement of the piston 16 it is necessary to leave an adequate space between the right hand end of the master cylinder 10 and the piston 16. The result of this is that the projection at the free end of the master cylinder beyond the body 18 of the servo mechanism is, as indicated in FIG. 1, 138 mm., in the particular form of construction shown.

The object of the present invention is to provide a form of construction for the fast-fill piston by means of which the length of the master cylinder allows the extent of its projection beyond the servo mechansim 10 to be substantially reduced to, for example, 91 mm. While this distance may not be particularly great it must be appreciated that in the construction of motor vehicles, space is at a premium in the engine compartment, particularly in the case of vehicles having front wheel drive and an engine, the axis of which is at right angles to the axis of the vehicle and that such a saving can be considerable signifigance.

the present invention comprises a master cylinder for use with a servo mechanism including primary, secondary and fast-fill pistons arranged in tandem, the fast-fill piston moving in a bore of larger diameter than that of the primary and secondary pistons characterised in that the fast-fill piston is of hollow annular construction having an inner cylindrical wall and an outer cylindrical wall joined together at one end and defining between them an annular space open at the other end, the outer wall being arranged to stroke past sealing means into an annular cavity at one end of the master cylinder surrounding part of the bore of the primary piston of the master cylinder and to displace fluid therefrom and the inner wall being arranged to move simultaneously within said part of the bore and to displace fluid therefrom to initiate movement of the secondary piston.

Figure 2:
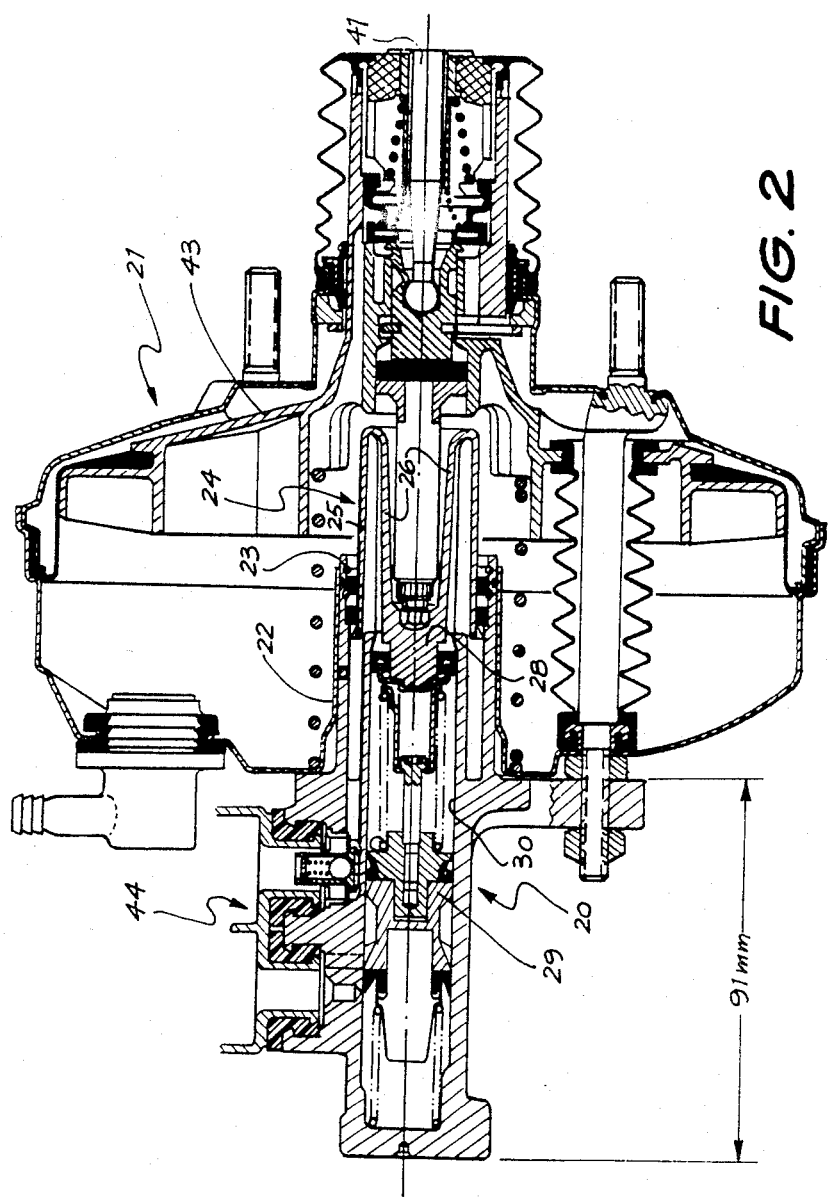
FIG. 2 shows a master cylinder according to the invention affixed to a servomechanism.
Figure 3:
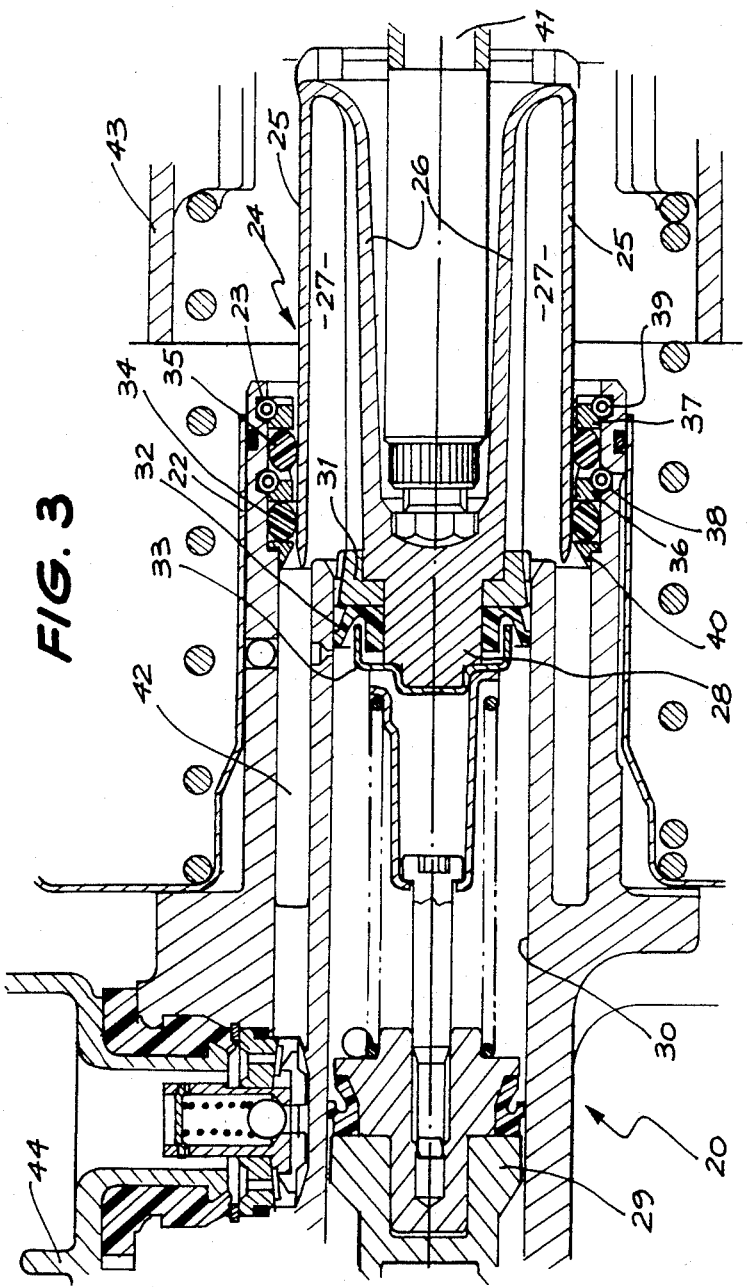
FIG. 3 is a view to an enlarged scale of the fast-fill piston and the parts associated therewith.

In the construction illustrated in FIGS. 2 and 3 the master cylinder is indicated generally at 20 and the servo mechanism at 21. As the functioning of the apparatus is substantially the same as that of known arrangements and in particular that illustrated in FIG. 1 only those parts of the construction directly relating to the present invention will be described. On making a comparison between the construction of FIG. 1 and that of FIGS. 2 and 3 it will be seen that the servo assembly in each case is the same with the exception that the sleeve 22 of the servo shell of FIG. 2 is open and the end 23 of the master cylinder 20 projects slightly beyond the sleeve 22. It will be noted, however, that the position of the end of the master cylinder within the servo assembly is substantially the same as in the construction of FIG. 1. On the other hand, the external projection of the master cylinder to the left in the case of the construction shown in FIG. 1 is 138 mm. whereas in the case of the construction shown in FIG. 2 it is only 91 mm. This is achieved by making the master cylinder assembly in such a manner that its compressed length is shorter and it is possible to do this by reason of the particular construction of the fast-fill piston 24 as shown in FIG. 2 and FIG. 3. Fast-fill piston 24 is constructed in a hollow annular form having an outer wall 25 and an inner wall 26 defining between them an annular space 27. The walls 25 and 26 are joined together at the right hand end in FIG. 2 and FIG. 3 to close the space 27 at that end. At the other end the inner wall 6 terminates in a boss 28 to form the primary piston and the operative connection of the primary piston 28 to the secondary piston 29 is provided through fluid within bore 30 of the master cylinder. The boss 28 is surrounded by the collar 31, the recuperative seal 32 and the seal retainer 33.

The outer wall 25 of the fast-fill piston 24 strokes past O ring seals 34 and 35, associated with back up rings 36 and 37, garter springs 38 and 39 and seal retainer 40.

When the fast-fill piston 24 is moved to the left under a force applied through the servo output rod 41 the outer wall 25 moves into the space 42 surrounding that portion of the bore 30 within which the inner wall of the fast-fill piston moves, displacing fluid from the spaces 27 and 42 past the recuperative seal 32 and into the bore 30. The inner wall 26 with recuperative seal 32, strokes within the bore 30 to displace fluid therefrom and thus initiate movement of the secondary piston 29.

It will be seen from FIG. 2 that the end of the fast-fill piston 24 extends well into the servo piston 43. This, however, is acceptable as the fast-fill piston 24 must move forward, that is to say to the left in FIG. 2 as the servo piston 43 moves. It would, however, be quite unacceptable to design the master cylinder of FIG. 1 to bring the end of the master cylinder to a position corresponding to the end of the fast-fill piston 24 of FIG. 2 as this would prevent movement of the servo piston 43.

As will be seen by comparing FIGS. 1 and 2 some modification of the master cylinder reservoir (18 in FIG. 1; 44 in FIG. 2) is required to take account of the changes necessitated in the construction of the body of the master cylinder, by reason of the use of a fast-fill piston as shown in FIGS. 2 and 3.

The embodiment of the invention described above is given by way of example only as constituting a preferred form of the invention and in particular the dimensions referred to are purely exemplary.

I claim:

1. In a master cylinder assembly for use with a servo mechanism including a servo piston travelling therein, said master cylinder assembly including primary, secondary and fast-fill pistons arranged in tandem, and the fast-fill piston moving in a bore of larger diameter than that of the primary and secondary pistons, the improvement wherein the fast-fill piston is of hollow annular construction comprising an inner cylindrical wall and an outer cylindrical wall joined together at one end and defining between them an annular space open at the other end, the outer surface of the outer wall being arranged to stroke past sealing means into an annular cavity at one end of the master cylinder surrounding part of the bore of the primary piston of the master cylinder and to displace fluid therefrom, said sealing means being located adjacent to said one end of the master cylinder such that, when the fast-fill piston is extended, it projects beyond said annular cavity, and an inner surface of the outer wall which is spaced from the inner wall of the annular cavity to define a passage through which said displaced fluid flows, the inner wall of the fast-fill piston forming part of the primary piston and being arranged to move simultaneously within said part of the bore and to displace fluid therefrom to initiate movement of the secondary piston, and the master cylinder assembly being adapted to be mounted on said servo mechanism with the projection of the fast-fill piston beyond the annular cavity occupying a space in the path of travel of said servo piston.

2. A master cylinder as claimed in claim 1 when attached to a shell of a servo mechanism, wherein the projection of the fast-fill piston beyond the annular cavity lies within the path of travel of the servo piston whereby the extent by which the master cylinder projects from the shell is reduced in comparison with a comparable conventional construction.

3. The master cylinder of claim 1, wherein the fast-fill piston, when in its extended position, projects beyond said annular cavity by a distance substantially equal to its stroke.

* * * * *